(12) United States Patent
Li et al.

(10) Patent No.: US 10,863,561 B2
(45) Date of Patent: Dec. 8, 2020

(54) PROSE RELAY DELAY REDUCTION

(71) Applicant: TELEFONAKTIEBOLAGET LM ERICSSON (PUBL), Stockholm (SE)

(72) Inventors: Yunxi Li, Järfälla (SE); Stefan Wänstedt, Luleå (SE); Eric Andersson, Järfälla (SE); Marco Belleschi, Solna (SE); Henrik Enbuske, Stockholm (SE); Mats Folke, Vällingby (SE); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 15/753,843

(22) PCT Filed: Aug. 19, 2016

(86) PCT No.: PCT/IB2016/054986
§ 371 (c)(1),
(2) Date: Feb. 20, 2018

(87) PCT Pub. No.: WO2017/029646
PCT Pub. Date: Feb. 23, 2017

(65) Prior Publication Data
US 2019/0014606 A1 Jan. 10, 2019

(30) Foreign Application Priority Data
Aug. 20, 2015 (WO) ................ PCT/CN2015/087668

(51) Int. Cl.
*H04W 76/14* (2018.01)
*H04W 28/26* (2009.01)
(Continued)

(52) U.S. Cl.
CPC .......... *H04W 76/14* (2018.02); *H04L 1/0003* (2013.01); *H04W 4/70* (2018.02);
(Continued)

(58) Field of Classification Search
CPC . H04W 76/14; H04W 72/0406; H04W 88/04; H04W 4/70; H04W 72/1278;
(Continued)

(56) References Cited

U.S. PATENT DOCUMENTS

2004/0162083 A1* 8/2004 Chen .................. H04W 52/286
455/454
2007/0189256 A1* 8/2007 Oh ........................ H04W 74/06
370/338
(Continued)

FOREIGN PATENT DOCUMENTS

| EP | 2833694 A2 | 2/2015 |
| WO | 2011019770 A1 | 2/2011 |
| WO | 2015050403 A1 | 4/2015 |

OTHER PUBLICATIONS

Coolpad, Discussion on Resource Allocation for ProSe UE-to-Network Relay, 3GPP TSG-RAN WG2 #91, R2-153252, Beijing, China, Aug. 24-28, 2015.
(Continued)

*Primary Examiner* — Jae Y Lee
*Assistant Examiner* — Jean F Voltaire
(74) *Attorney, Agent, or Firm* — Sage Patent Group (57) ABSTRACT

According to some embodiments, a method in a first wireless device of relaying data from a second wireless device to a wireless communication network comprises: obtaining data transmission information associated with data to be relayed from the second wireless device to the wireless communication network; requesting resources from the wireless communication network according to the data transmission information before receiving the data to be relayed; receiving an indication of resources from the wireless communication network; receiving the data from the second wireless device; and transmitting the data to the wireless communication network using the indicated
(Continued)

resources. In particular embodiments, the data transmission information includes at least one of an amount of data to be relayed from the second wireless device to the wireless communication network and an estimated time for receiving the data from the second wireless device at the first wireless device.

16 Claims, 8 Drawing Sheets

(51) Int. Cl.
| | | |
|---|---|---|
| *H04W 88/04* | (2009.01) | |
| *H04W 72/12* | (2009.01) | |
| *H04W 4/70* | (2018.01) | |
| *H04L 1/00* | (2006.01) | |
| *H04W 28/02* | (2009.01) | |
| *H04W 72/04* | (2009.01) | |
| *H04W 72/14* | (2009.01) | |
| *H04W 92/18* | (2009.01) | |

(52) U.S. Cl.
CPC ....... *H04W 28/0278* (2013.01); *H04W 28/26* (2013.01); *H04W 72/0406* (2013.01); *H04W 72/1278* (2013.01); *H04W 72/14* (2013.01); *H04W 88/04* (2013.01); *H04W 92/18* (2013.01)

(58) Field of Classification Search
CPC . H04W 28/26; H04W 28/0278; H04W 92/18; H04W 72/14; H04L 1/0003
USPC ........................................................ 370/329
See application file for complete search history.

(56) References Cited

U.S. PATENT DOCUMENTS

| | | | |
|---|---|---|---|
| 2010/0150022 A1* | 6/2010 | Cai ................... | H04B 7/15542 370/254 |
| 2010/0220645 A1* | 9/2010 | Kwon ................. | H04B 7/2606 370/315 |
| 2011/0205980 A1* | 8/2011 | Prakash ............... | H04W 28/26 370/329 |
| 2011/0242990 A1* | 10/2011 | Simonsson ......... | H04W 72/085 370/242 |
| 2012/0026934 A1* | 2/2012 | Park ......................... | H04L 5/14 370/315 |
| 2013/0003650 A1* | 1/2013 | Han ...................... | H04B 7/155 370/315 |
| 2014/0328329 A1* | 11/2014 | Novlan ............. | H04W 56/0015 370/336 |
| 2015/0289289 A1* | 10/2015 | Qian .................... | H04W 72/14 370/329 |
| 2016/0113031 A1* | 4/2016 | Sun ................... | H04W 72/1268 370/336 |
| 2016/0227574 A1* | 8/2016 | Raina .................... | H04W 72/14 |
| 2016/0338095 A1* | 11/2016 | Faurie .............. | H04W 28/0278 |

OTHER PUBLICATIONS

3GPP TS 36.213 V12.6.0, 3rd Generation Partnership Project; Technical Specification Group Radio Access Network; Evolved Universal Terrestrial Radio Access (E-UTRA); Physical layer procedures (Release 12), Jun. 2015.

* cited by examiner

PROSE RELAY DELAY REDUCTION

This application is a 371 of International Application No. PCT/IB2016/054986, filed Aug. 19, 2016, which claims the benefit of International Application No. PCT/CN2015/087668, filed Aug. 20, 2015, the disclosures of which are fully incorporated herein by reference.

TECHNICAL FIELD

Particular embodiments relate generally to wireless communications networks, and more particularly to reduction of uplink delay where a wireless device transmits data to a wireless network via another wireless device, such as in proximity services (ProSe) relay.

RELATED APPLICATION

This application claims benefit under 35 U.S.C. § 365(c) to International Patent Application Serial No. PCT/CN2015/087668, filed Aug. 20, 2015 and entitled "UL Delay Reduction in ProSe Relay," the entire content of which is incorporated herein by reference.

BACKGROUND

Device-to-device (D2D) communication is a component of many existing wireless technologies, including ad hoc and cellular networks. Examples include Bluetooth and several variants of the IEEE 802.11 standards suite, such as WiFi Direct. These systems operate in unlicensed spectrum.

D2D communications as an underlay to cellular networks takes advantage of the proximity of communicating devices and enables devices to operate in a controlled interference environment. Typically, D2D communications share the same spectrum as the cellular system. For example, a D2D device may reserve some of its cellular uplink resources for D2D purposes. Allocating dedicated spectrum for D2D purposes, however, is an unlikely alternative because spectrum is a scarce resource and dynamic sharing between the D2D services and cellular services is more flexible and provides better spectrum efficiency.

A D2D device may send data using various transmission modes. These include unicast (i.e., a specific wireless device is the receiver), multicast (i.e., a group of wireless devices are the receiver—also referred to as groupcast), and broadcast (i.e., all wireless devices are receivers).

When cellular network D2D communication is unavailable, a D2D device may send data to another D2D device without prior arrangement. This reduces overhead and increases communication capacity, which is important in emergency situations. The source D2D device transmits data to one (unicast) or more (multicast/groupcast/broadcast) other D2D devices, without first verifying that the recipient devices are available and ready to receive the data. Such communication may be used for one-to-one or one-to-many communication, but it is particularly effective for multicast and broadcast transmissions and thus well-suited for broadcast and group communication. The communication may occur, for example, via PHY unicast/multicast/groupcast/broadcast transmissions. Even using PHY broadcast transmissions, higher layers may treat the transmissions as unicast, groupcast, or multicast. For example, in the MAC layer, multicast or even unicast addresses may be used. Or, alternatively, if using broadcast on both PHY and MAC, multicast or unicast IP addresses may be used at the IP layer.

One way to efficiently implement D2D communication is to use a scheduling assignment (SA) followed by a data transmission. SAs are control messages used for direct scheduling of D2D communication. SAs are transmitted by the user equipment (UE) that intends to transmit D2D data and they are received by the UEs that are potentially interested in the D2D data. SAs are transmitted on dedicated resources characterized by time and frequency, and are typically a sparse resource. SAs provide information useful to the receiver. For example, a receiving device may use an SA to decode the D2D data transmission associated with the SA (e.g., the resources for data transmission, the modulation/coding parameters, timing information, identities for the transmitter and/or receiver, etc.). Typically, but not necessarily, a D2D device transmits SAs prior to the actual data transmission so that a receiving D2D device is able to selectively receive data based on the content of the SAs. The data transmissions scheduled by a SA may be referred to as a "transmission pattern."

D2D application scenarios include, among others, proximity services (ProSe) where devices detect their proximity and subsequently trigger different services (such as social applications triggered by user proximity, advertisements, local exchange of information, smart communication between vehicles, etc.). Other applications include public safety support, where devices provide at least local connectivity even in case of damage to the radio infrastructure.

A ProSe UE-to-network relay can extend the coverage of the network beyond the coverage of the eNB. A ProSe relay is a UE that performs the role of a relay. The ProSe UE-to-network relay function includes support for relaying of unicast traffic (uplink and downlink) between remote UEs that are not served by evolved UMTS terrestrial radio access network (E-UTRAN) and the network. The ProSe UE-to-network relay provides a generic L3 forwarding function that can relay any type of IP traffic, such as traffic for public safety communication. An example is illustrated in FIG. 1.

Figure 1:
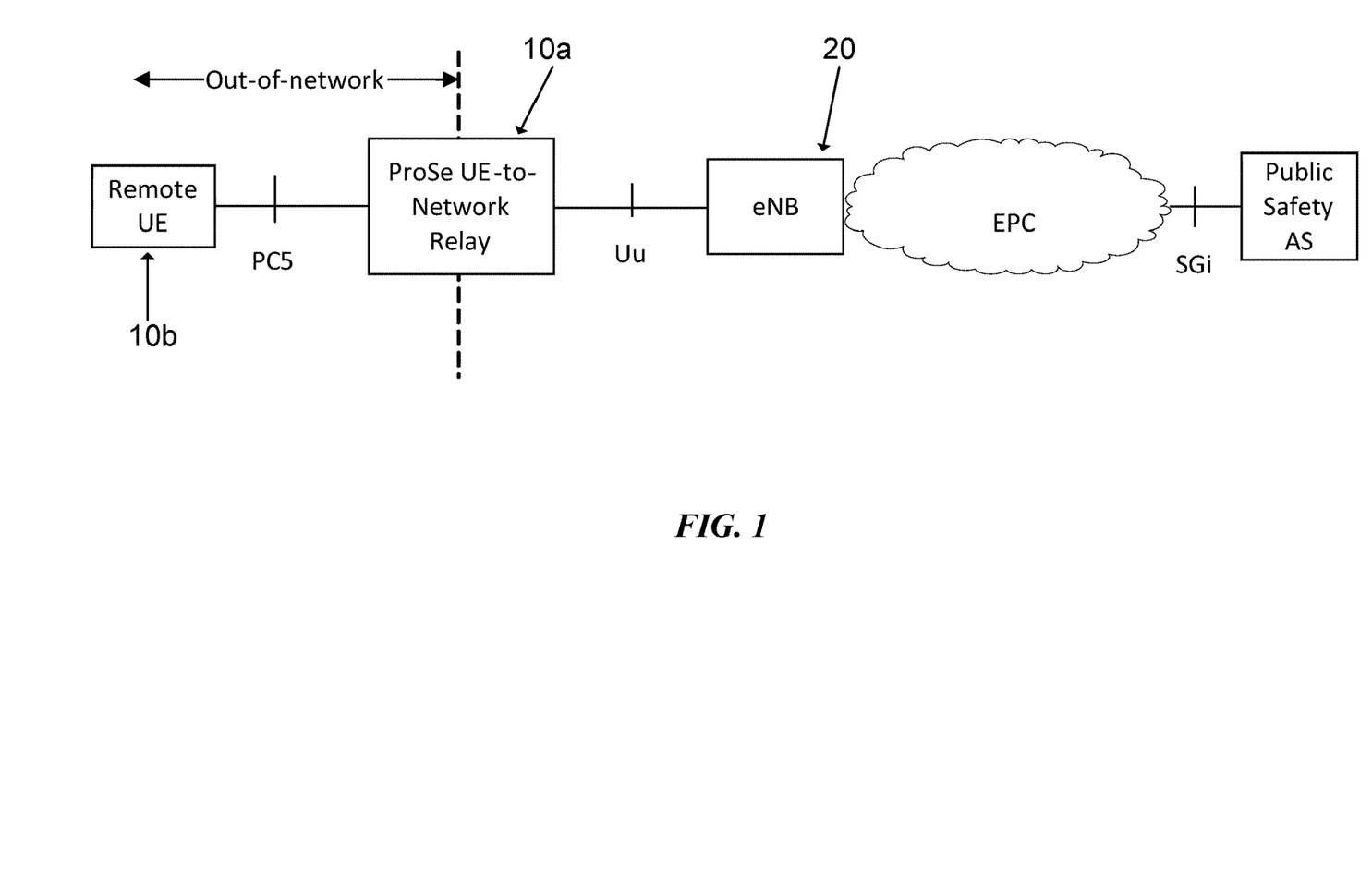
FIG. 1 is a block diagram illustrating an example wireless network including a proximity services UE-to-network relay.

FIG. 1 is a block diagram illustrating an example wireless network including a proximity services UE-to-network relay. Remote UE 10*b* is in one-to-one direct ProSe communication with relay UE 10*a* over a PC5 layer 2 link. Relay UE 10*a* is in communication with eNB 20 over a Uu interface, which is in communication with a public safety system via an evolved packet core (EPC). Relay 10*a* forwards layer 3 traffic from remote UE 10*b* to eNB 20.

Establishing a link between remote UE 10*b* and eNB 20 via ProSe UE-to-network relay 10*a* includes three general steps: (1) setup of relay UE 10*a*; (2) E-UTRAN assisted relay discovery; and (3) establishment of a secure layer 2 link over PC5. When remote UE 10*b* receives instruction from eNB 20 to connect to a particular relay, remote UE 10*b* sends a layer 3 message (from ProSe Signaling Protocol) to associate itself with relay UE 10*a*. Relay UE 10*a* responds with the layer 3 message. Connection establishment between remote UE 10*b* and relay UE 10*a* uses the ProSe signaling protocol. An example of the PC5 protocol stack is illustrated in FIG. 2.

Figure 2:
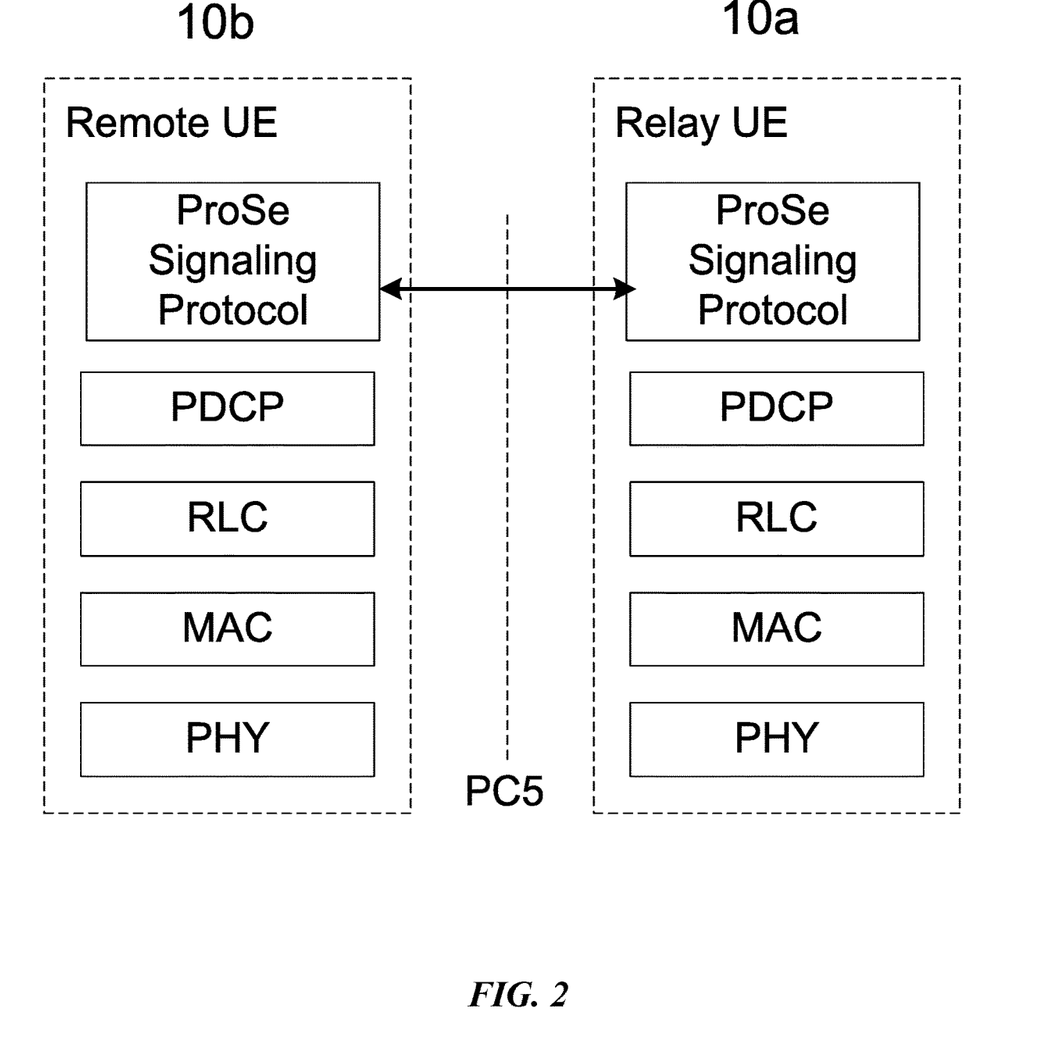
FIG. 2 is a block diagram illustrating the PC5 protocol stack between a remote UE and a relay UE.

FIG. 2 is a block diagram illustrating the PC5 protocol stack between a remote UE and a relay UE. A remote UE, such as remote UE 10*b* illustrated in FIG. 1, communicates with a relay UE, such as relay UE 10A illustrated in FIG. 1, via the ProSe signaling protocol. The ProSe signaling protocol is on top of the PDCP, RLC, MAC, and PHY layers. The priority of a ProSe communication transmission is selected by the application layer based on criteria that are not in the scope of ProSe specifications. The interaction of the application layer and the ProSe communication lower layers may be neutral with respect to the way the UE accesses the medium (i.e., whether using scheduled or autonomous transmission modes).

To transmit uplink data via a ProSe relay, relay UE 10a receives data via a sidelink from remote UE 10b and transmits the data to eNB 20 via a cellular link. An example is illustrated in FIG. 3.

Figure 3:
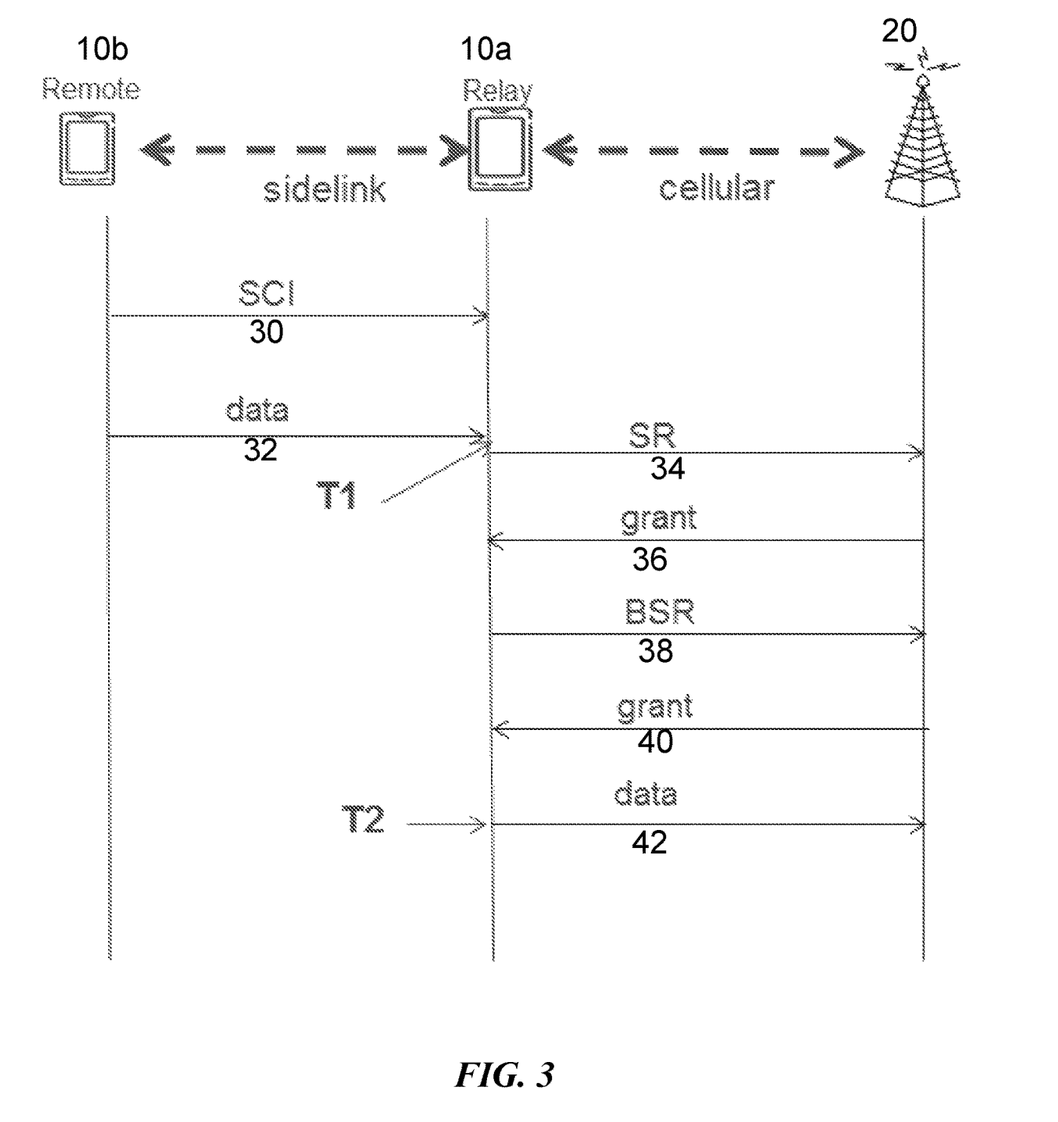
FIG. 3 is an example flow diagram illustrating allocation of Uu transmission resources.

FIG. 3 is an example flow diagram illustrating allocation of Uu transmission resources. Remote UE 10b transmits data to eNB 20 via relay UE 10a. At step 30 remote UE 10b sends sidelink control information (SCI) to relay UE 10a followed by step 32 where remote UE 10b sends data to relay UE 10a. The time at which relay UE 10a receives the data transmission from remote UE 10b may be referred to as T1.

After receiving data from remote UE 10b, relay UE 10a requests uplink resources from eNB 20 before it can transmit the data to eNB 20. Requesting uplink resources may include relay UE 10a sending a status request (SR) to eNB 20 at step 34 and, at step 36, receiving a corresponding uplink resource grant. Relay UE 10a may also send a buffer status report (BSR) at step 38 and receive a corresponding uplink resource grant at step 40. At step 42, relay UE 10a uses the granted resources to transmit the data to eNB 20. The time at which relay UE 10a transmits the data to eNB 20 may be referred to as T2.

The procedure for requesting and receiving transmission resources introduces additional delay at the relay UE. For example, relay UE 10a receives data from remote UE 10b at T1, but relay UE 10a cannot transmit the data to eNB 20 until T2 when relay UE 10a is granted uplink resources. The time between T1 and T2 is the delay introduced by relay UE 10a.

SUMMARY

In the embodiments described herein, a relay wireless device, such as a ProSe relay user equipment (UE), obtains information about a data transmission (e.g., amount of data, arrival time, etc.) to be received from a source wireless device, such as a ProSe remote UE. The relay wireless device uses the information to request transmission resources at least partially in advance of receiving the data transmission. For example, the relay wireless device may request and receive transmission resources from the wireless network based on information in sidelink control information (SCI) received from the source wireless device before the source wireless device transmits data to the relay wireless device.

According to some embodiments, a method in a first wireless device of relaying data from a second wireless device to a wireless communication network comprises: obtaining data transmission information associated with data to be relayed from the second wireless device to the wireless communication network; requesting resources from the wireless communication network according to the data transmission information before receiving the data to be relayed; receiving an indication of resources from the wireless communication network; receiving the data from the second wireless device; and transmitting the data to the wireless communication network using the indicated resources.

In particular embodiments, the data transmission information includes at least one of an amount of data to be relayed from the second wireless device to the wireless communication network and an estimated time for receiving the data from the second wireless device at the first wireless device.

In particular embodiments, obtaining the data transmission information comprises receiving sidelink control information (SCI) from the second wireless device. The first wireless device may estimate an amount of data to be relayed from the second device based on at least one of the resource block assignment and the modulation and coding scheme (MCS) in the received SCI.

In particular embodiments, requesting resources from the wireless communication network according to the data transmission information comprises transmitting a scheduling request (SR) to the wireless communication network. Particular embodiments may further comprise transmitting a buffer status report (BSR) to the wireless communication network.

In particular embodiments, the method comprises estimating a resource grant delay. The resource grant delay comprises a delay between requesting resources from the wireless communication network according to the data transmission pattern information and receiving the indication of resources from the wireless communication network. Estimating the resource grant delay may be based on previous resource requests. Requesting resources from the wireless communication network according to the data transmission information may be performed an amount of time equal to or greater than the determined grant delay before receiving the data to be relayed.

According to some embodiments, a relay wireless device capable of relaying data from a source wireless device to a wireless communication network comprises a processor, a memory, and a power source. The processor is operable to: obtain data transmission information associated with data to be relayed from the source wireless device to the wireless communication network; request resources from the wireless communication network according to the data transmission information before receiving the data to be relayed; receive an indication of resources from the wireless communication network; receive the data from the source wireless device; and transmit the data to the wireless communication network using the indicated resources.

According to some embodiments, a relay wireless device capable of relaying data from a source wireless device to a wireless communication network comprises an obtaining module, a requesting module, a receiving module, and a transmitting module. The obtaining module is operable to obtain data transmission information associated with data to be relayed from the source wireless device to the wireless communication network. The requesting module is operable to request resources from the wireless communication network according to the data transmission information before receiving the data to be relayed. The receiving module is operable to receive an indication of resources from the wireless communication network, and receive the data from the source wireless device. The transmitting module is operable to transmit the data to the wireless communication network using the indicated resources.

According to some embodiments, a relay user equipment (UE) capable of relaying data from a source UE to a wireless communication network comprises an antenna configured to send and receive wireless signals, and radio front-end circuitry connected to the antenna and to processing circuitry. The radio front-end circuitry is configured to condition signals communicated between the antenna and the processing circuitry. The processing circuitry is configured to: obtain data transmission information associated with data to be relayed from the source UE to the wireless communication network; request resources from the wireless communication network according to the data transmission information before receiving the data to be relayed; receive an indication of resources from the wireless communication network; receive the data from the source UE; and transmit the data to the wireless communication network using the indicated resources. The relay UE further comprises: an input interface connected to the processing circuitry and configured to allow input of information into the relay UE to be processed by the processing circuitry; an output interface connected to the processing circuitry and configured to output information from the relay UE that has been processed by the processing circuitry; and a battery connected to the processing circuitry and configured to supply power to the relay UE.

Also disclosed is a computer program product. The computer program product comprises instructions stored on non-transient computer-readable media which, when executed by a processor, performs the acts of: obtaining data transmission information associated with data to be relayed from the second wireless device to the wireless communication network; requesting resources from the wireless communication network according to the data transmission information before receiving the data to be relayed; receiving an indication of resources from the wireless communication network; receiving the data from the second wireless device; and transmitting the data to the wireless communication network using the indicated resources.

Particular embodiments may exhibit some of the following technical advantages. Particular embodiments may reduce delay introduced in a relay wireless device (e.g., relay UE) that occurs when the relay wireless device requests resources from a network node (e.g., from an eNB) for network transmission (e.g., Uu transmission). For example, in particular embodiments, resource allocation on the network interface may be optimized according to the pattern of the data to be transmitted, which reduces the delay and resource consumption. In some embodiments, to reduce delay introduced by a relay wireless device requesting network resources (for each data burst), the relay wireless device requests the resources for network transmission before it receives the data to be relayed from the source wireless device. The relay wireless device can estimate when a particular amount of resources will be needed according to the information in the SCI (i.e., similar to SA referred to above), which is received from the source wireless device prior to the data.

In general, when a relay wireless device relays data from a source wireless device to a network node, some additional delay is introduced in the relay wireless device because of the relay wireless device requesting resources for network transmission. Particular embodiments may significantly reduce the additional delay (to zero in some cases). Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

A relay wireless device requests uplink resources from a network node to transmit data received from a source wireless device to a wireless network. The conventional procedure for requesting and receiving transmission resources introduces additional delay at the relay wireless device. For example, a relay wireless device receives data from a source wireless device at time T1, but relay wireless device cannot transmit the data to a network node until time T2 when the relay wireless device is granted uplink resources. The difference between T1 and T2 is the delay introduced at the relay wireless device.

Particular embodiments obviate the problems described above by reducing delay introduced in a relay wireless device. For example, in particular embodiments, resource allocation on the network interface may be optimized according to a pattern of the data to be transmitted. In some embodiments, the relay wireless device requests the resources for network transmission before it receives the data to be relayed from the source wireless device. The relay wireless device may estimate when a particular amount of resources will be needed according to the information in the SCI, which is received from the source wireless device prior to receiving the data. Accordingly, the relay wireless device may reduce or even eliminate delay.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-8 of the drawings, like numerals being used for like and corresponding parts of the various drawings. LTE is used throughout this disclosure as an example cellular system, but the ideas presented herein may apply to other wireless communication systems as well.

Figure 4:
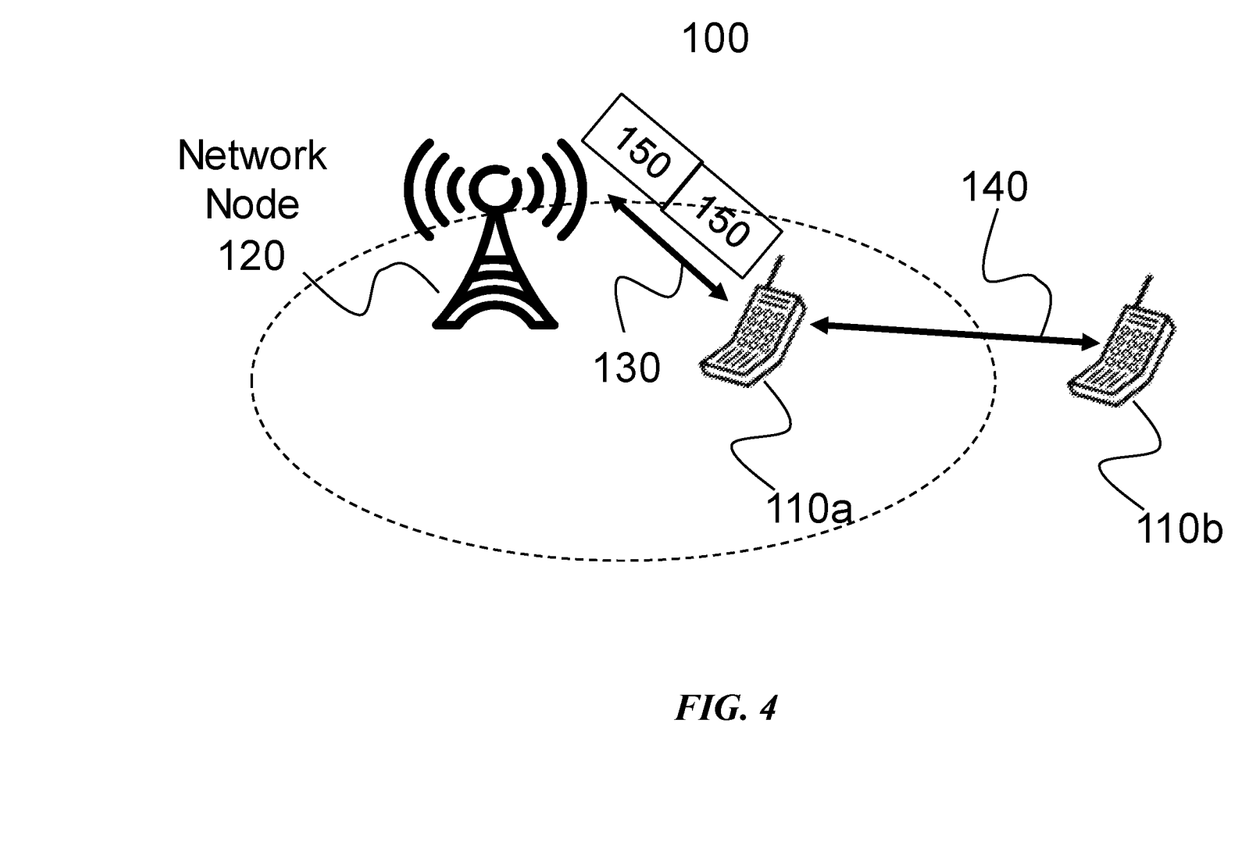
FIG. 4 is a block diagram illustrating an example wireless network, according to some embodiments.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication. A particular D2D application includes ProSe communications.

In particular embodiments, wireless signal 140 may use a different carrier frequency than the carrier frequency of wireless signal 130. For example, wireless device 110a may communicate with network node 120a using a first frequency band and may communicate with wireless device 110b using the same frequency band or a second frequency band. Wireless devices 110a and 110b may be served by the same network node 120 or by different network nodes 120. In particular embodiments, one or both of network nodes 110a and 110b may be out-of-coverage of any network node 120.

In particular embodiments, wireless devices 110 may communicate with each other using particular transmission resources 150. Transmission resources 150 comprise particular time and frequency resources. Transmission resources 150 may be shared among both D2D communications (i.e., between wireless devices 110) and cellular communications (i.e., between wireless device 110 and network node 120). For example, particular embodiments may reserve some of the cellular uplink resources for D2D communication.

In particular embodiments, D2D transmission resources 150 may include pooled resources. For example, particular embodiments may define a number of pools available for sending discovery, control, or data transmissions. In LTE, wireless device 110 may transmit discovery messages on a PSDCH, control messages on a PSCCH, and data on a PSSCH. To transmit data, wireless device 110 may use one or more transmission resources 150 (e.g., time and/or frequency resources) from one of the D2D resource pools. When wireless device 110 is in communication with network node 120, wireless device 110 may receive one more pool configurations from network node 120. When wireless device 110 is out-of-coverage, wireless device 110 may rely on preconfigured D2D pools.

In particular embodiments, wireless device 110a may comprise a ProSe UE-to-network relay. Wireless device 110a may be in-coverage of network node 120 and wireless device 110b may out-of-coverage of network node 120. Wireless device 110a may connect wireless device 110b to network node 120 by relaying transmissions from wireless device 110b to network node 120. In particular embodiments, wireless device 110b may be in one-to-one direct ProSe communication with wireless device 110a over a PC5 layer 2 link. Wireless device 110a may be in communication with network node 120 over a Uu interface. Wireless device 110a may forward layer 3 traffic from wireless device 110b to network node 120. To transmit data received from wireless device 110b to network node 120, wireless device 110a may request transmission resources 150 (e.g., uplink resources) from network node 120. Wireless device 110b may support a variety of different services, each comprising a particular data transmission pattern.

In particular embodiments, wireless device 110a may obtain data transmission information associated with data to be relayed from wireless device 110b to network node 120. In some embodiments, wireless device 110a may estimate when a particular amount of transmission resources 150 will be needed according to the information in, for example, the SCI, which may be received from wireless device 110b prior to receiving the data.

Wireless device 110a may request transmission resources 150 from network node 120 according to the data transmission pattern information (e.g., SPS resources for period patterns, bulk resources for uploads, estimated arrival time and amount of data, etc.). In particular embodiments, wireless device 110a may request transmission resources 150 in advance of receiving the data to relay from wireless device 110b.

Wireless device 110a may receive an indication of transmission resources 150 from the wireless communication network (e.g., receive an uplink grant). Wireless device 110a may receive data from wireless device 110b and transmit the data to network node 120 using the indicated transmission resources 150. Particular algorithms for requesting transmission resources 150 are described in more detail with respect to FIGS. 5 and 6.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8 below.

According to some embodiments, a relay wireless device may reduce the delay introduced by requesting network resources for each data burst by requesting the transmission resources before the relay wireless device receives the data to be relayed from the source wireless device. The relay wireless device may estimate an amount of resources and a time that the resources will be needed according to the information in, for example, a scheduling assignment or sidelink control information, which is received from the source wireless device prior to the data. An example is illustrated in FIG. 5.

Figure 5:
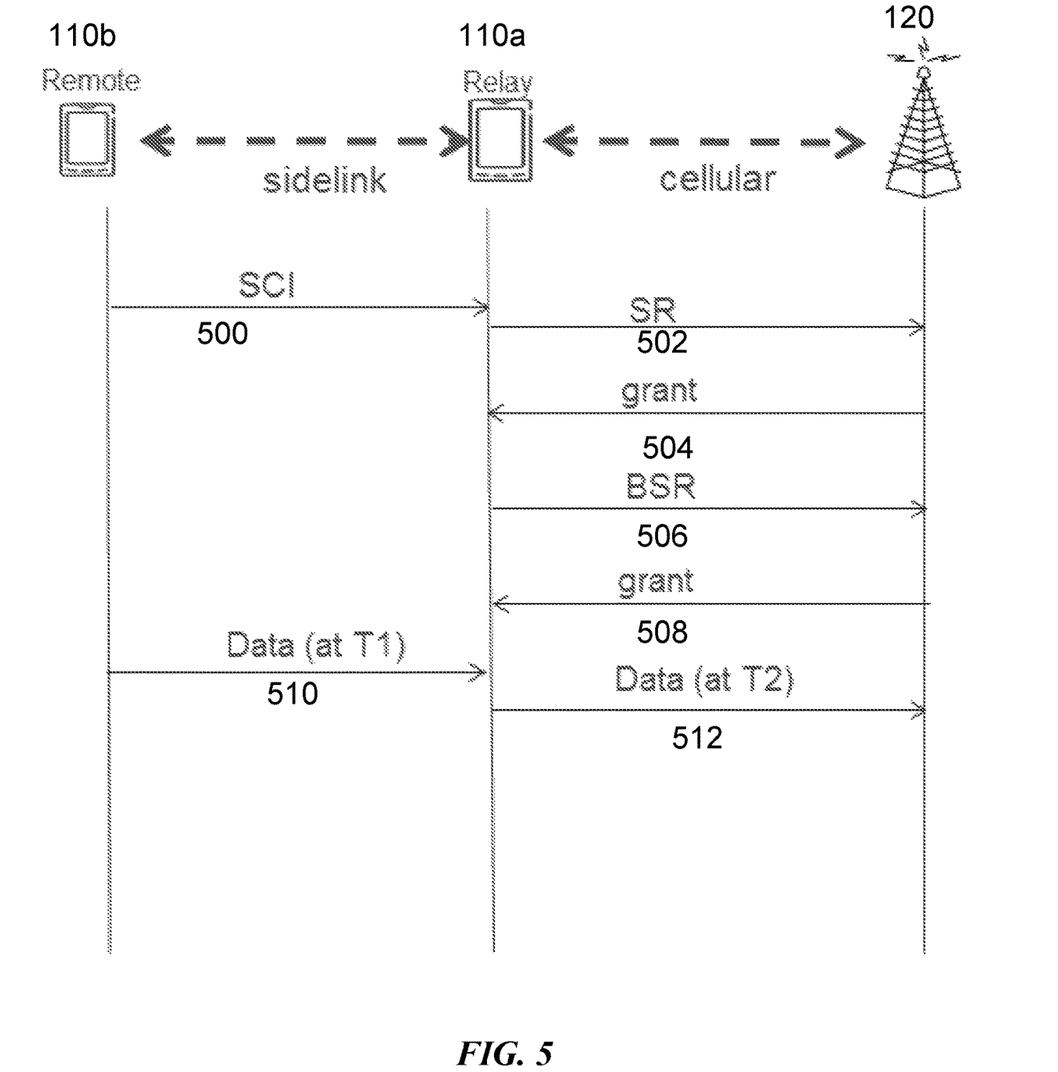
FIG. 5 is an example flow diagram illustrating allocation of transmission resources based on transmission data information, according to some embodiments.

FIG. 5 is an example flow diagram illustrating allocation of transmission resources based on transmission data information, according to some embodiments. In general, source wireless device 110b transmits data to network node 120 via relay wireless device 110a.

At step 500, source wireless device 110b transmits sidelink control information (SCI) to relay wireless device 110a. The SCI may include resource block assignment, modulation coding scheme, etc. Relay wireless device 110a receives the SCI, and if relay wireless device 110a has not requested any transmission resources, such as Uu resources, for that data associated with the SCI, then relay wireless device 110a estimates a data amount (DATA_AMOUNT) and a data arrival time (T1) according to the information in the SCI (e.g., resource block assignment, modulation coding scheme, etc.).

Relay wireless device 110a requests cellular uplink transmission resources from network node 120 to relay data. For example, at step 502 relay wireless device 110a sends a Scheduling Request (SR) to network node 120. At step 504, network node 120 grants relay wireless device 110a uplink resources.

At step 506, relay wireless device 110a uses a portion of the transmission resources granted at step 504 to send a buffer status report (BSR) indicating relay wireless device 110a has DATA_AMOUNT of data to relay to network node 120. At step 508, network node 120 grants relay wireless device 110a uplink resources.

At step 510, source wireless device 110b transmits data to relay wireless device 110a. Relay wireless device 110a receives the data at time T1. Because relay wireless device 110a has already requested transmission resources, relay wireless device 110a may transmit the received data to network node 120 almost immediately thereafter at time T2. Thus, particular embodiments minimize the delay between T1 and T2.

In particular embodiments, the BSR triggering mechanisms may vary depending on latency and protocol/technology. For example, in LTE Release 12 a regular D2D BSR is only triggered if no data is available in the buffer. Because the traffic from the source wireless device is already suffering from latency issues (i.e., at least two hops to reach the network node), a regular BSR may be triggered at reception of new data from a source wireless device. In some embodiments, a regular D2D BSR may be triggered by the relay wireless device buffer if the priority of the incoming source wireless device traffic is higher than the priority of other source wireless device packets (possibly belonging to other source wireless devices) currently queued in the relay wireless device buffer.

In particular embodiments, a relay wireless device sends an uplink transmission resource request timed such that T2 occurs after T1. In some embodiments, the relay wireless device does not send an uplink transmission resource request until it receives a sidelink shared channel (SL-SCH) transmission from the source wireless device associated with the concerned SCI (i.e., the relay wireless device sends an uplink transmission resource request after T1.)

In particular embodiments, a relay wireless device may determine when to transmit a resource request according to the following algorithm. The relay wireless device estimates the delay from the relay wireless device sending a resource request to the time when the relay wireless device can transmit data using granted uplink resources (i.e., GRANT_DELAY). The GRANT_DELAY may take into account, for instance, an estimation of the time to send a scheduling request (SR) until a subsequent BSR is granted by the network, as well as the time needed by the relay wireless device to process the uplink grant (e.g., 4 ms in LTE). The GRANT_DELAY may be based on historic information. In particular embodiments, the timing of transmitting the resource request >=T1−GRANT_DELAY.

In particular embodiments, upon reception of an SR (and before reception of a BSR) the network node sends an uplink grant to the relay wireless device that is larger than for a non-relay wireless device. The network node does not know the buffer status upon reception of the SR, so the first uplink grant may be sufficiently large to accommodate the BSR and also some amount of data (even if the amount is currently unknown). Because the relay buffer is expected to contain more data (both data generated by the relay wireless device itself and the source wireless device), the size of the uplink grant may be larger.

In some embodiments, the SR is sent before T1 on the basis of GRANT_DELAY estimation, but the BSR is sent after T1. This may provide a better BSR estimation, because from SCI the relay wireless device might not be able to learn the priorities of incoming source wireless device traffic.

In certain embodiments, the network node may, after sending an uplink grant, consider the uplink grant valid for longer time than 4 ms. The network node may not expect the relay wireless device to send uplink data on PUSCH 4 ms after the uplink grant reception. Thus, if the relay wireless device has not yet received any data from the source wireless device, the relay wireless device may still consider the uplink grant valid for a longer time without a need to send an SR again. Some embodiments maintain the 8 ms HARQ process mechanism (i.e., if no data has yet been received in the subframe for which the uplink grant is valid, the same uplink grant may be used 8 ms, 16 ms, etc., later. After a configurable time, the uplink grant may be considered invalid.

Figure 6:
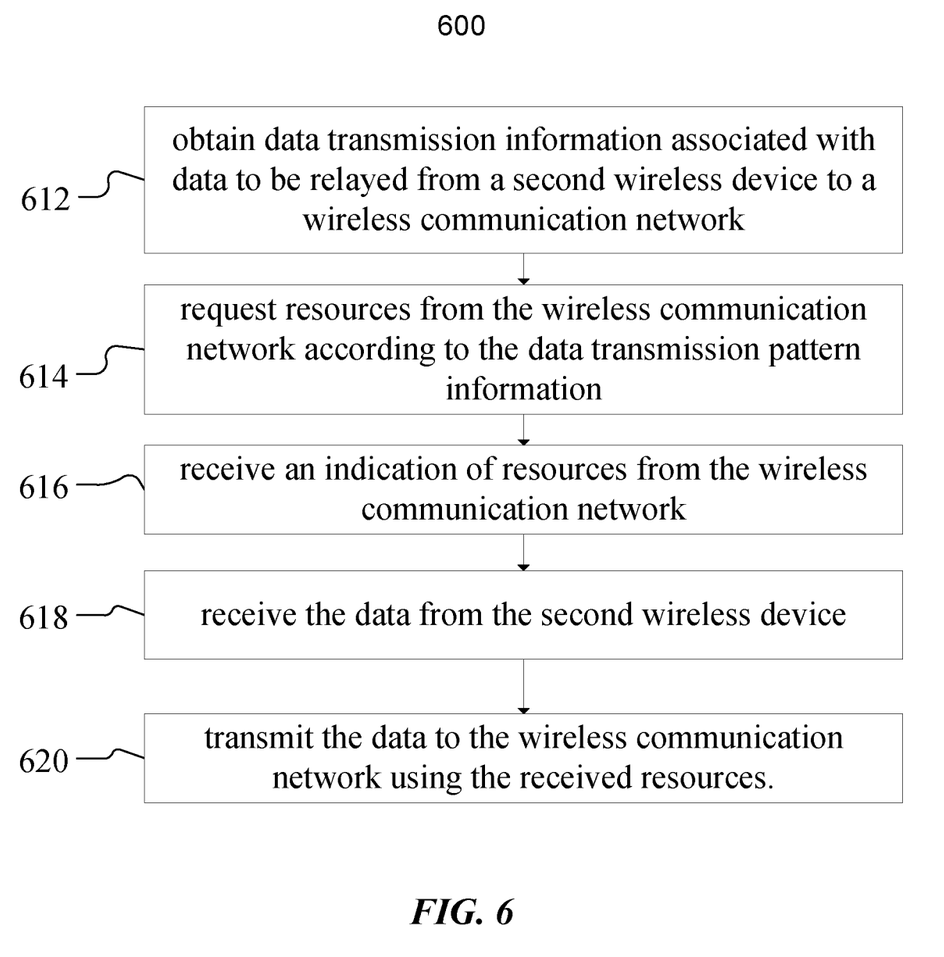
FIG. 6 is a flow diagram illustrating an example method in a first wireless device of relaying data from a second wireless device to a wireless communication network, according to some embodiments.

FIG. 6 is a flow diagram illustrating an example method in a first wireless device of relaying data from a second wireless device to a wireless communication network, according to some embodiments. In particular embodiments, one or more steps of FIG. 6 may be performed by a wireless device 110 of wireless network 100 described with respect to FIG. 4.

The method begins at step 612, where a first wireless device obtains data transmission information associated with data to be relayed from a second wireless device to a wireless communication network. For example, wireless device 110a may obtain data transmission information (e.g., data amount, time of arrival, etc.) from wireless device 110b associated with data to be relayed to network node 120.

Data transmission information may be signaled from wireless device 110b to wireless device 110a. For example, wireless device 110b may send sidelink control information (SCI) to wireless device 110a. SCI may include resource block assignment, modulation coding scheme, etc. Wireless device 110a may estimate a data amount and arrival time based on the SCI.

In other embodiments, the data amount and timing may be indicated via any suitable signaling between D2D wireless devices. In particular embodiments, wireless device 110a may estimate a data arrival time based on historical data. In particular embodiments, obtaining the data transmission information comprises receiving explicit or implicit signaling according to any of the embodiments described with respect to FIG. 5.

At step 614, the first wireless device requests resources from the wireless communication network according to the data transmission information. At least a portion of the transmission resources are requested before receiving the data to be relayed at time T1. For example, wireless device 110a may request transmission resources 150 from network node 120 according to the data transmission information (e.g., data amount, arrival time, etc.) obtained at step 612.

In particular embodiments, wireless device 110a may send a status request (SR) to network node 120 before T1. In particular embodiments, wireless device 110a may also send a buffer status request (BSR) to network node 120 before time T1. In particular embodiments, wireless device 110a may request transmission resources 150 according to any of the embodiments described with respect to FIG. 5.

In particular embodiments, the first wireless device may calculate a grant delay (GRANT_DELAY) for requesting resources (i.e., an amount of time between requesting resources and receiving the resources). GRANT_DELAY may be calculated based on historical delays. In particular embodiments, the first wireless device determines an estimated data arrival time (T1) and requests resources at least GRANT_DELAY time units in advance of T1.

At step 616, the first wireless device receives an indication of resources from the wireless communication network. For example, wireless device 110a may receive a resource grant (i.e., and indication of which transmission resources 150 wireless device 110a may use for uplink transmission) from network node 120.

At step 618, the first wireless device receives the data from the second wireless device at time T1. For example, wireless device 110a receives some or all of the data (e.g., VoIP, FTP, HTTP, etc.) to be relayed from wireless device 110b to network node 120.

At step 620, the first wireless device transmits the data to the wireless communication network using the received resources. For example, wireless device 110a transmits the data received from wireless device 110b to network node 120 using the resources granted at step 616 at time T2.

In particular embodiments, the first wireless device may continue to receive data transmissions from the second wireless device and forward the received data transmissions to the wireless communications network until the transmission resources granted at step 616 are no longer available. At that time, the first wireless device may request additional transmission resources as described with respect to step 614.

Modifications, additions, or omissions may be made to method 600. Additionally, one or more steps in method 600 of FIG. 6 may be performed in parallel or in any suitable order. The steps of method 600 may be repeated over time as necessary.

Figure 7A:
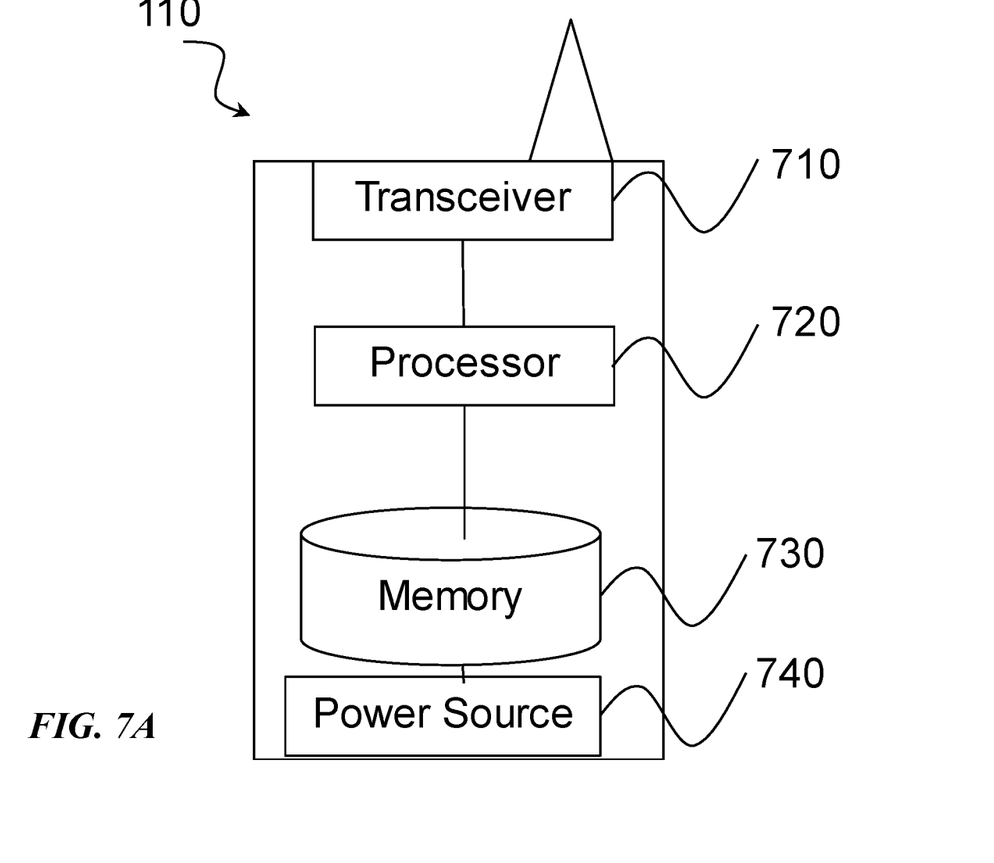
FIG. 7A is a block diagram illustrating an example embodiment of a wireless device.

FIG. 7A is a block diagram illustrating an example embodiment of a wireless device. The wireless device is an example of the wireless devices 110 illustrated in FIG. 4. The wireless device is capable of relaying data from another wireless device to a wireless communication network. The wireless device obtains data transmission information associated with data to be relayed from the second wireless device to the wireless communication network. The wireless device uses the data transmission information to request resources from the wireless communication network before receiving the data to be relayed, and receives an indication of resources from the wireless communication network. The wireless device receives data from the second wireless device, and transmits the data to the wireless communication network using the indicated resources. In particular embodiments, the wireless devices obtains the data transmission information by receiving the data transmission information from the second wireless device, such as in sidelink control information (SCI).

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 710, processor 720, memory 730, and power supply 740. In some embodiments, transceiver 710 facilitates transmitting wireless signals to and receiving wireless signals from wireless network node 120 (e.g., via an antenna), processor 720 executes instructions to provide some or all of the functionality described herein as provided by the wireless device, and memory 730 stores the instructions executed by processor 720. Power supply 740 supplies electrical power to one or more of the components of wireless device 110, such as transceiver 710, processor 720, and/or memory 730.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power supply 740 is generally operable to supply electrical power to the components of wireless device 110. Power supply 740 may include any suitable type of battery, such as lithium-ion, lithium-air, lithium polymer, nickel cadmium, nickel metal hydride, or any other suitable type of battery for supplying power to a wireless device.

In particular embodiments, processor 720 in communication with transceiver 710 obtains data transmission information associated with data to be relayed from the source wireless device to the wireless communication network; requests resources from the wireless communication network according to the data transmission information before receiving the data to be relayed; receives an indication of resources from the wireless communication network; receives the data from the source wireless device; and transmits the data to the wireless communication network using the indicated resources.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

Figure 7B:
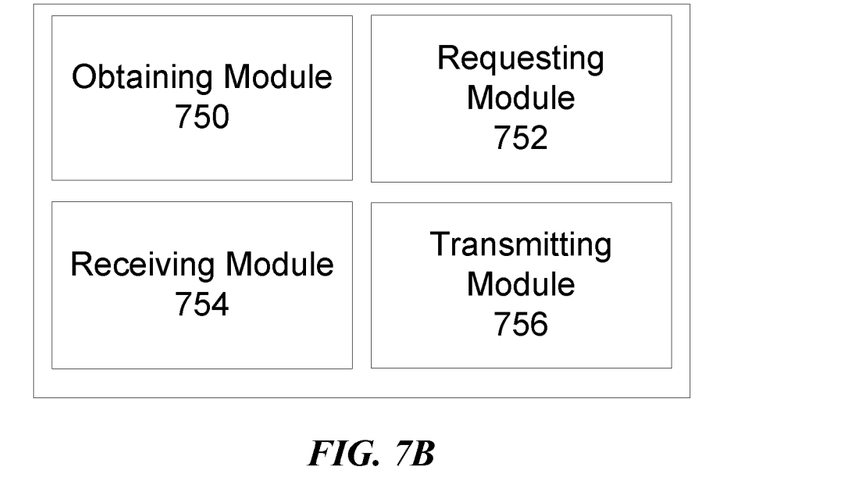
FIG. 7B is a block diagram illustrating example components of a wireless device.

FIG. 7B is a block diagram illustrating example components of a wireless device 110. The components may include obtaining module 750, requesting module 752, receiving module 754, and transmitting module 756.

Obtaining module 750 may perform the obtaining functions of wireless device 110. For example, obtaining module 750 may obtain data transmission information associated with data to be relayed from a source wireless device to a wireless communication network. In certain embodiments, obtaining module 750 may include or be included in processor 720. In particular embodiments, obtaining module 750 may communicate with requesting module 752, receiving module 754, and transmitting module 756.

Requesting module 752 may perform the requesting functions of wireless device 110. For example, requesting module 752 may request resources (e.g., SR, BSR, etc.) from the wireless communication network according to the data transmission information. In certain embodiments, requesting module 752 may include or be included in processor 720. In particular embodiments, requesting module 752 may communicate with obtaining module 750, receiving module 754, and transmitting module 756.

Receiving module 754 may perform the receiving functions of wireless device 110. For example, receiving module 754 may receive an indication of resources from the wireless communication network, and receive data from a source wireless device. In certain embodiments, receiving module 754 may include or be included in processor 720. Receiving module 754 may include circuitry configured to receive radio signals. In particular embodiments, receiving module 754 may communicate with obtaining module 750, requesting module 752, and transmitting module 756.

Transmitting module 756 may perform the transmitting functions of wireless device 110. For example, transmitting module 756 may transmit the data received from the source wireless device to the wireless communication network using the requested resources. In certain embodiments, transmitting module 756 may include or be included in processor 720. Transmitting module 756 may include circuitry configured to transmit radio signals. In particular embodiments, transmitting module 756 may communicate with obtaining module 750, requesting module 752, and receiving module 754.

Figure 8:
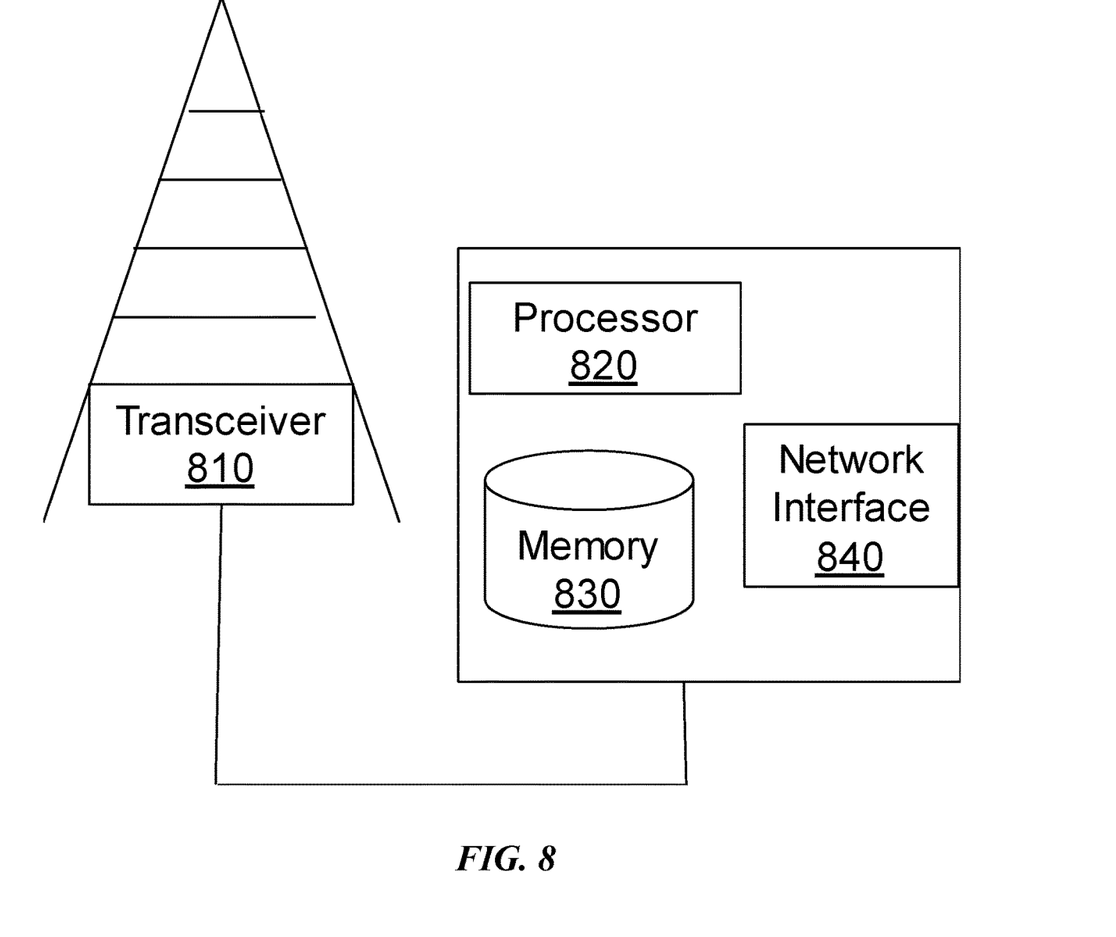
FIG. 8 is a block diagram illustrating an example embodiment of a network node.

FIG. 8 is a block diagram illustrating an example embodiment of a network node. The network node is an example of the network node 120 illustrated in FIG. 4. The network node is capable of granting transmission resources to a wireless device and receiving data transmissions from the wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 810, at least one processor 820, at least one memory 830, and at least one network interface 840. Transceiver 810 facilitates transmitting wireless signals to and receiving wireless signals from a wireless device, such as wireless devices 110 (e.g., via an antenna); processor 820 executes instructions to provide some or all of the functionality described above as being provided by a network node 120; memory 830 stores the instructions executed by processor 820; and network interface 840 communicates signals to backend network components, such as a gateway, switch, router, Internet, Public Switched Telephone Network (PSTN), controller, and/or other network nodes 120. Processor 820 and memory 830 can be of the same types as described with respect to processor 720 and memory 730 of FIG. 7A above.

In some embodiments, network interface 840 is communicatively coupled to processor 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processor 820 in communication with transceiver 810 grants transmission resources to a wireless device and receives data transmissions from the wireless device.

Other embodiments of network node 120 include additional components (beyond those shown in FIG. 8) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, resource allocation on the network interface may be optimized according to a pattern of the data to be transmitted. In some embodiments, the relay wireless device requests the resources for network transmission before it receives the data to be relayed from the source wireless device. The relay wireless device may estimate when a particular amount of resources will be needed according to the information in the SCI, which is received from the source wireless device prior to receiving the data. Accordingly, the relay wireless device may reduce or even eliminate delay. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BSR Buffer Status Report
BTS Base Transceiver Station
D2D Device to Device
eNB eNodeB
EPC Evolved Packet Core
LTE Long Term Evolution
MAC Medium Access Layer
M2M Machine to Machine
MCS Modulation and Coding Scheme
MIMO Multi-Input Multi-Output
MTC Machine Type Communication
ProSe Proximity Services
PSCCH Physical Sidelink Control Channel
PSDCH Physical Sidelink Discovery Channel
PSSCH Physical Sidelink Channel
RAN Radio Access Network
RAT Radio Access Technology
RRC Radio Resource Control
RRH Remote Radio Head
RRU Remote Radio Unit
SA Scheduling assignment
SC Sidelink Control
SCI Sidelink Control Information
SL-SCH Sidelink Shared Channel
SR Status Request
UE User Equipment
VoIP Voice Over IP
WAN Wireless Access Network

The invention claimed is:

1. A method in a first wireless device of relaying data from a second wireless device to a wireless communication network, the method comprising:
obtaining data transmission information associated with data to be relayed from the second wireless device to the wireless communication network;
estimating a resource grant delay, the resource grant delay comprising a delay between requesting resources from the wireless communication network according to the data transmission information and receiving the indication of resources from the wireless communication network;
estimating an amount of resources to be relayed from the second wireless device to the wireless communication network and a time that the resources will be needed according to the data transmission information;
requesting resources from the wireless communication network based on estimating the amount of resources to be relayed from the second wireless device to the wireless communication network and the time that the resources will be needed according to the data transmission information before receiving the data to be relayed;
receiving an indication of resources from the wireless communication network;
receiving the data from the second wireless device after requesting the resources; and
transmitting the data to the wireless communication network using the resources indicated.

2. The method of claim 1, wherein the amount of resources and the time the resources will be needed is estimated based on information in the data transmission information including at least one of an amount of data to be relayed from the second wireless device to the wireless communication network and an estimated time for receiving the data from the second wireless device at the first wireless device.

3. The method of claim 1, wherein obtaining the data transmission information comprises receiving sidelink control information (SCI) from the second wireless device.

4. The method of claim 3, wherein the first wireless device estimates an amount of data to be relayed from the second wireless device based on at least one of a resource block assignment and a modulation and coding scheme (MCS) in the SCI received.

5. The method of claim 1, wherein requesting resources from the wireless communication network according to the data transmission information comprises transmitting a scheduling request (SR) to the wireless communication network.

6. The method of claim 5, wherein requesting resources from the wireless communication network according to the data transmission information further comprises transmitting a buffer status report (BSR) to the wireless communication network.

7. The method of claim 1, wherein estimating the resource grant delay is based on previous resource requests.

8. The method of claim 1, wherein requesting resources from the wireless communication network according to the data transmission information is performed an amount of time equal to or greater than the resource grant delay estimated before receiving the data to be relayed.

9. A relay wireless device capable of relaying data from a source wireless device to a wireless communication network, the relay wireless device comprising a processor, a memory, and a power source, the processor operable to:
obtain data transmission information associated with data to be relayed from the source wireless device to the wireless communication network;

estimate a resource grant delay, the resource grant delay comprising a delay between requesting the resources from the wireless communication network according to the data transmission information and receiving the indication of the resources from the wireless communication network;

estimating an amount of resources to be relayed from the source wireless device to the wireless communication network and a time that the resources will be needed according to the data transmission information;

request resources from the wireless communication network based on estimating the amount of resources to be relayed from the source wireless device to the wireless communication network and the time that the resources will be needed according to the data transmission information before receiving the data to be relayed;

receive an indication of resources from the wireless communication network;

receive the data from the source wireless device after requesting the resources; and transmit the data to the wireless communication network using the resources indicated.

10. The relay wireless device of claim 9, wherein the amount of resources and the time the resources will be needed is estimated based on information in the data transmission information including at least one of an amount of data to be relayed from the source wireless device to the wireless communication network and an estimated time for receiving the data from the source wireless device at the relay wireless device.

11. The relay wireless device of claim 9, wherein the processor obtains the data transmission information by receiving sidelink control information (SCI) from the source wireless device.

12. The relay wireless device of claim 11, wherein the processor is operable to estimate an amount of data to be relayed from the source wireless device based on at least one of a resource block assignment and a modulation and coding scheme (MCS) in the SCI received.

13. The relay wireless device of claim 9, wherein the processor is operable to request resources from the wireless communication network according to the data transmission information by transmitting a scheduling request (SR) to the wireless communication network.

14. The relay wireless device of claim 13, wherein the processor is operable to request resources from the wireless communication network according to the data transmission information by transmitting a buffer status report (BSR) to the wireless communication network.

15. The relay wireless device of claim 9, wherein the processor is operable to estimate the resource grant delay based on previous resource requests.

16. The relay wireless device of claim 14, wherein the processor is operable to request resources from the wireless communication network according to the data transmission information an amount of time equal to or greater than the resource grant delay estimated before receiving the data to be relayed.

* * * * *